(12) United States Patent
Coroiu et al.

(10) Patent No.: US 11,625,484 B2
(45) Date of Patent: *Apr. 11, 2023

(54) BINARY SEARCH OF BYTE SEQUENCES USING INVERTED INDICES

(71) Applicant: Crowdstrike, Inc., Irvine, CA (US)

(72) Inventors: Horea Coroiu, Cluj-Napoca (RO); Daniel Radu, Bucharest (RO)

(73) Assignee: CrowdStrike, Inc., Irvine, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 16/752,374

(22) Filed: Jan. 24, 2020

(65) Prior Publication Data

US 2020/0159923 A1 May 21, 2020

Related U.S. Application Data

(60) Continuation of application No. 16/252,388, filed on Jan. 18, 2019, now Pat. No. 10,546,127, which is a division of application No. 15/400,561, filed on Jan. 6, 2017, now Pat. No. 10,430,585.

(51) Int. Cl.

| | | |
|---|---|---|
| *G06F 21/56* | (2013.01) | |
| *G06F 16/14* | (2019.01) | |
| *H04L 9/40* | (2022.01) | |
| *H04W 12/128* | (2021.01) | |
| *G06F 16/901* | (2019.01) | |

(52) U.S. Cl.
CPC .......... *G06F 21/564* (2013.01); *G06F 16/152* (2019.01); *H04L 63/1416* (2013.01); *H04W 12/128* (2021.01); *G06F 16/901* (2019.01); *G06F 2221/033* (2013.01)

(58) Field of Classification Search
CPC ...... G06F 21/564; G06F 21/565; G06F 16/13; G06F 16/152; G06F 16/22; G06F 16/24; G06F 16/245; G06F 16/2455; G06F 16/319; G06F 16/901; G06F 40/211; G06F 2221/033; H04L 63/1416
See application file for complete search history.

(56) References Cited

U.S. PATENT DOCUMENTS

| | | |
|---|---|---|
| 6,633,867 B1 | 10/2003 | Kraft et al. |
| 8,843,493 B1 | 9/2014 | Liao et al. |
| 9,501,506 B1 | 11/2016 | Fontoura et al. |
| 9,910,986 B1 | 3/2018 | Saxe et al. |

(Continued)

OTHER PUBLICATIONS

Coulouris, et al., "Distributed Systems Concepts and Design", Addison Wesley,Third Edition, 2001, pp. 31-47.

(Continued)

*Primary Examiner* — Minh Dinh
(74) *Attorney, Agent, or Firm* — Lee & Hayes, P.C.

(57) ABSTRACT

Techniques for searching an inverted index associating byte sequences of a fixed length and files that contain those byte sequences are described herein. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences comprising a file are searched in the inverted index and results of the search are used to generate signatures and fuzzy hashes.

20 Claims, 9 Drawing Sheets

(56) References Cited

U.S. PATENT DOCUMENTS

| | | |
|---|---|---|
| 2004/0064442 A1 | 4/2004 | Popovitch |
| 2007/0050384 A1 | 3/2007 | Whang et al. |
| 2008/0133565 A1 | 6/2008 | Yasuda et al. |
| 2014/0089258 A1 | 3/2014 | She |
| 2016/0124966 A1 | 5/2016 | Cohen |
| 2016/0267270 A1 | 9/2016 | Lee et al. |
| 2016/0335286 A1 | 11/2016 | Desineni et al. |
| 2017/0068732 A1 | 3/2017 | Newman et al. |
| 2017/0262633 A1 | 9/2017 | Miserendino et al. |
| 2018/0196943 A1 | 7/2018 | Coroiu et al. |
| 2018/0196944 A1 | 7/2018 | Coroiu et al. |
| 2019/0156030 A1 | 5/2019 | Coroiu et al. |
| 2019/0156031 A1 | 5/2019 | Coroiu et al. |
| 2019/0156032 A1 | 5/2019 | Coroiu et al. |
| 2019/0266141 A1 | 8/2019 | Coroiu et al. |

OTHER PUBLICATIONS

Final Office Action dated Dec. 22, 2020 for U.S. Appl. No. 15/858,497, "Applications of a Binary Search Engine Based on an Inverted Index of Byte Sequences", Coroiu, 10 pages.
Ebringer, "Bindex 2.0," Virus Bulletin, retrieved from «https://www.virusbulletin.com/conference/vb2011/abstracts/bindex-2-0/» on Jan. 6, 2017, 1 page.
The Extended European Search Report dated May 22, 2018 for European Patent Application No. 17207285.2, 10 pages.
The Partial European Search Report dated May 24, 2019, for European Patent Application No. 18248145.7, 15 pages.
The Partial Supplementary European Search Report dated Feb. 16, 2018 for European patent application No. 17207285.2, 11 pages.
The Extended European Search Report dated Sep. 9, 2019 for European Patent Application No. 18248145.7, 20 pages.
French, "Fuzzy Hashing Techniques in Applied Malware Analysis", Carnegie Mellon University, Mar. 28, 2011, 2 pages.
"GitHub—CrowdStrike/CrowdFMS: Crowdstrike Feed Management System," https://git.hub.com./CrowdStrike/CrowdFMS, downloaded Dec. 28, 2017, 2 pages.
Jin et al., "A Scalable Search Index for Binary Files", Malicious and Unwanted Software (Malware), 2012 7th Internation Conferences on, IEEE, Oct. 16, 2012, pp. 94-103.
Karbab et al., "Fingerprinting Android packaging: Generating DNAs for malware detection", Digital Investigation 18, 2016, pp. 33-45.
Lee et al., "Using syntactic information in handling natural language queries for extended boolean retrieval model", In Proceedings of the 4th international workshop on information retrieval with Asian languages (IRAL99), Nov. 1999, pp. 63-70.
Li, et al., "Experimental Study of Fuzzy Hasing in Malware Clustering Analysis", 2015, 8 pages.
Office Action for U.S. Appl. No. 16/252,359, dated Mar. 7, 2019, Coroiu, "Binary Search of Byte Sequences Using Inverted Indices," 5 pages.
Non Final Office Action dated Mar. 21, 2019 for U.S. Appl. No. 16/252,388 "Binary Search of Byte Sequences Using Inverted Indices" Coroiu, 7 pages.
Office Action for U.S. Appl. No. 15/400,561, dated Dec. 14, 2018, Coroiu, "Binary Search of Byte Sequences Using Inverted Indices", 6 pages.
Sauer et al., "Query Processing and Optimization using Computer Tools", in the Proceedings of the 2010 Grundlagen von Datenbanken, May 28, 2010, 5 pages.
Somil et al., "Parallel Inverted Index for Large-Scale, Dynamic Digital Libraries", retrieved at «URL:http://citeseerx.ist.psu.edu/viewdoc/download?doi=10.1.1.605.6679&rep=rep1&type=pdf», Jan. 1, 2001, 100 pages.
SourceForge, "ssdeep—Latest version 2.13," retrieved from «http://ssdeep.sourceforge.net/» on Jan. 6, 2017, last updated Apr. 24, 2015, 3 pages.
"Writing Yara Rules," Yara, published 2014, http://yara.readthedocs.io/en/v3.7.0/writingrules.html, 23 pages.
"Yara," Wikipedia, https://en.wikipedia.org/wiki/YARA, downloaded Dec. 28, 2017, 1 page.
The Extended European Search Report dated Oct. 8, 2020 for European Patent Application No. 20173057.9, a counterpart foreign application of U.S. Appl. No. 16/411,850, 9 pages.
Li, et al., "ROPNN: Detection of ROP Payloads Using Deep Neural Networks", arxiv.org, Cornell University Library, Jul. 29, 2018, pp. 1-11.
The European Office Action dated Jun. 18, 2020 for European Patent Application No. 17207285.2, a counterpart foreign application of the U.S. Pat. No. 10,430,585, 6 pages.
Jain, et all., "Byte Level n-Gram Analysis for Malware Detection", Springer-Verlag, 2011, pp. 51-59.
Kolter, et al., "Learning to Detect Malicious Executables in the Wild", ACM, 2004, pp. 470-478.
Non Final Office Action dated Apr. 6, 2020 for U.S. Appl. No. 15/858,497 "Applications of a Binary Search Engine Based on an Inverted Index of Byte Sequences" Coroiu, 8 pages.
Raff,et. al., "An investigation of byte n-gram features for malware classification", Springer-Velag, 2016, pp. 1-20.
European Office Action dated Apr. 13, 2021 for European Patent Application No. 17207285.2, a counterpart foreign application of U.S. Pat. No. 10,430,585, 6 pages.

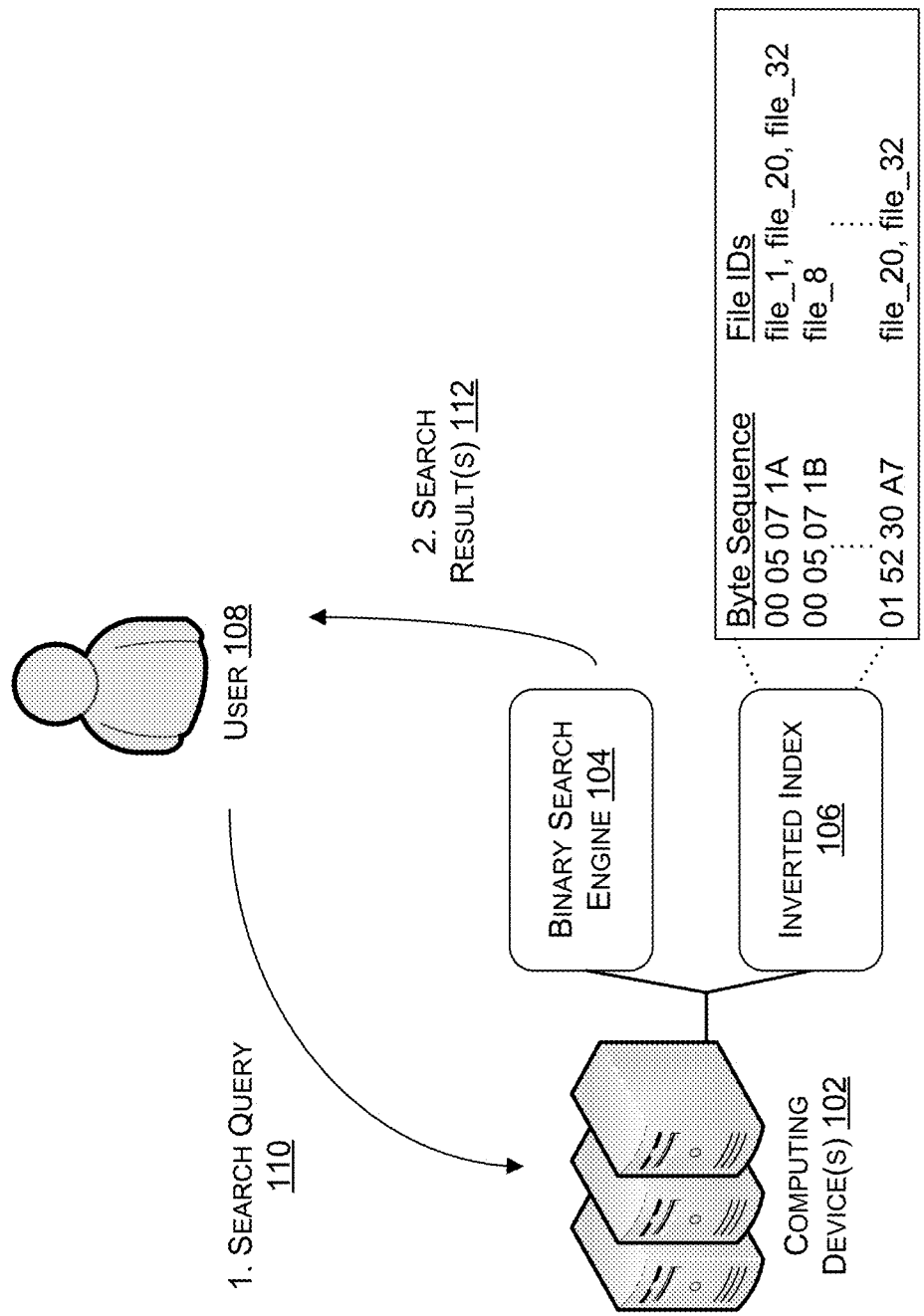

BINARY SEARCH OF BYTE SEQUENCES USING INVERTED INDICES

RELATED APPLICATION

This application is a continuation of, and claims priority to, U.S. patent application Ser. No. 16/252,388, filed on Jan. 18, 2019, now known as U.S. Pat. No. 10,546,127, issued on Jan. 28, 2020, which is a divisional of and claims priority to U.S. patent application Ser. No. 15/400,561, filed on Jan. 6, 2017, also known as U.S Pat. No. 10,430,585, issued on Oct. 1, 2019, and entitled "Binary Search of Byte Sequences Using Inverted Indices," which is incorporated by reference herein.

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, and other malicious programs and malware may be formatted as executable files, dynamic link libraries (DLLs), scripts, and/or other types of computer programs.

Malware authors or distributors ("adversaries") frequently disguise or obfuscate malware in attempts to evade detection by malware-detection or -removal tools. Consequently, it is time consuming to determine if a program is malware.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1a-1d illustrate an example overview of computing device(s) configured with a binary search engine and an inverted index that enable searching the contents of binary files and executable files, signature generation, and fuzzy hash generation.

DETAILED DESCRIPTION

Figure 1B:
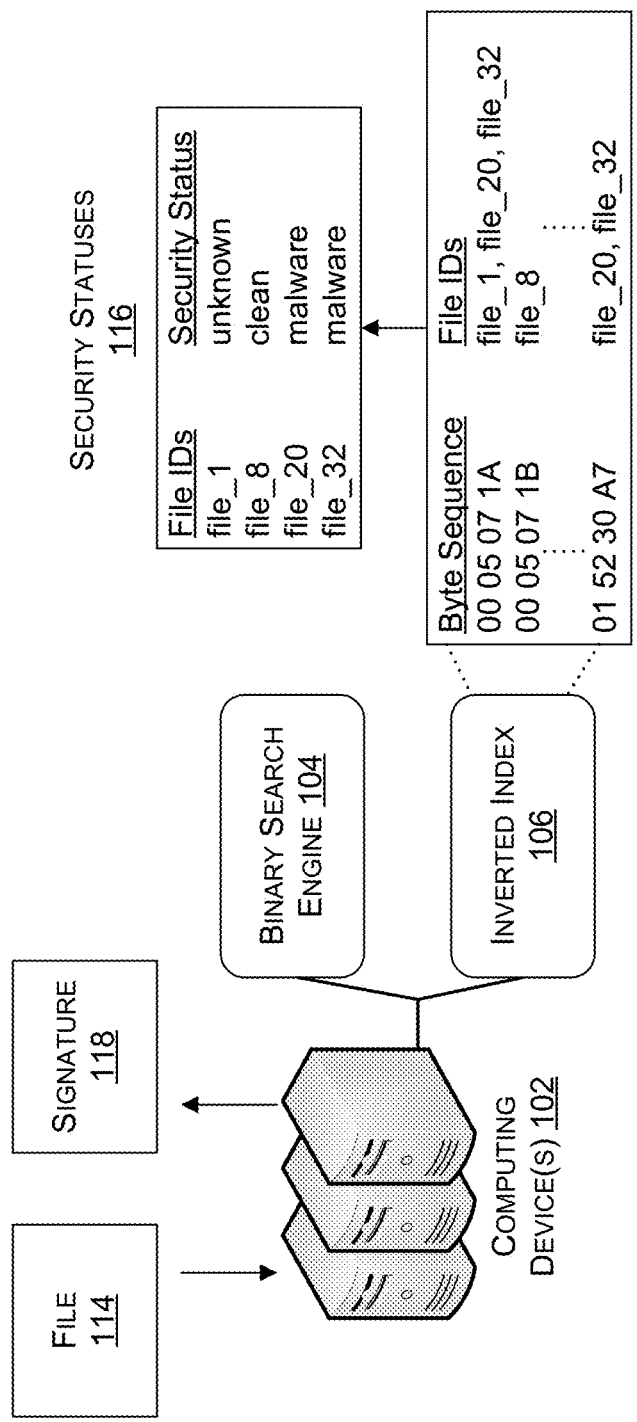

This disclosure describes, in part, techniques for searching an inverted index associating byte sequences of a fixed length and files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences extracted from a file are searched in the inverted index and results of the search are used to generate signatures and fuzzy hashes.

In various implementations, one or more computing devices may generate the inverted index from a corpus of files, such as a corpus of malware files, binary files, executable files, etc. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes.

In further implementations, the inverted index may be utilized to generate a signature for a file. For each byte sequence of a fixed length comprising a file, computing device(s) search the inverted index. The inverted index or related data may also specify, for each file identifier, a security status associated with the file of that file identifier. The computing device(s) then create a list of candidate byte sequences based on results of the search in which the candidate byte sequences are only found in files that are associated with a malware status or an unknown status. The computing device(s) select candidate byte sequences that are associated with the most file identifiers and generate a signature from the selected candidate byte sequences.

In some implementations, as noted above, the search query may include an expression, such as an expression including at least two search terms and at least one logical operator. In response to receiving an expression, the computing device(s) may search in the inverted index for each byte sequence of a fixed length that comprises each of the search terms. The computing device(s) then evaluate the results using a syntax tree constructed from the at least one logical operator and return a search result to the search query based on the evaluating.

In various implementations, the computing device(s) may utilize the inverted index to create a fuzzy hash for a file. For each byte sequence of a fixed length comprising a file, the computing device(s) search the inverted index. The computing device(s) then identify a subset of search results that are associated with the fewest file identifiers (but which have more than zero file identifiers) and construct a fuzzy hash from byte sequences comprising the subset. Also, the resulting byte sequences used to construct the fuzzy has may have a different length than the fixed length byte sequences of the inverted index.

Example Overview

FIGS. 1a-1d illustrate an example overview of computing device(s) configured with a binary search engine and an inverted index that enable searching the contents of binary files and executable files, signature generation, and fuzzy hash generation.

The computing device(s) 102 illustrated in FIGS. 1a-1d may be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some implementations, the computing device(s) 102 may represent virtual machines implemented on computing device(s). An example computing device 102 is illustrated in FIG. 2 and described below with reference to that figure.

In various implementations, the computing device(s) 102 may be associated with a security service, a research entity, or may not be associated with any service or entity. As illustrated in FIGS. 1a-1d by the bracket, the computing device(s) 102 may include a binary search engine 104 and an inverted index 106. The inverted index 106 may be constructed from and identify a corpus of files, such as a corpus of malware files obtained by a security service or research efforts. The corpus of files may, however, include any sort of files, such as binary files, executable files, unstructured files, etc. In some implementations, the inverted index may be created by one service or entity and subsequently provided to other service(s) and/or entit(ies).

Additionally, the computing device(s) 102 may comprise a service cluster, a data center, a cloud service, etc., or a part thereof. The binary search engine 104 and the inverted index 106 may each be implemented on single one(s) of the computing device(s) 102, on multiple ones of the computing device(s) 102 (e.g., as multiple instances of the binary search engine 104 or the inverted index 106), distributed among the computing device(s) 102 (e.g., with modules of the binary search engine 104 distributed among the computing device(s) 102 and/or parts of the inverted index 106 distributed among the computing device(s) 102), or any combination thereof. Further, the inverted index 106 may be stored on disk storage of the computing device(s) 102.

In some implementations, the binary search engine 104 illustrated in FIGS. 1a-1d may be configured to accept any sort of query from a user, such as a text/string query, a structured query (e.g., an expression including a logical operator), or a specific byte sequence. The binary search engine 104 may then generate byte sequences of a fixed length from that search query. For example, the binary search engine 104 may identify each possible contiguous byte sequence of a certain length comprising the query. That length may in turn correspond to a fixed length utilized by the inverted index (e.g., a fixed length of four bytes). For example, if the query corresponds to the byte sequence "03 62 D1 34 12 00," the binary search engine 104 may determine the following sequences to be searched: "03 62 D1 34," "62 D1 34 12," and "D1 34 12 00." Upon determining the byte sequences of the fixed length, the binary search engine 104 queries the inverted index 106 for each byte sequence and receives, in return, file identifiers of files that include those byte sequences as file contents. The binary search engine 104 may then take any of a number of further acts described with respect to FIGS. 1a-1d.

In further implementations, either the binary search engine 104 or another component of the computing device(s) 102 may receive a file and determine the byte sequences of the fixed length comprising that file. For example, if the contents of the file are the byte sequence "03 62 D1 34 12 00", the binary search engine 104 or component may determine the following sequences to be searched: "03 62 D1 34", "62 D1 34 12", and "D1 34 12 00". If an additional component performs the receiving and determining, the additional component may then provide the byte sequences to the binary search engine 104. The binary search engine 104 may then query the inverted index 106 for each byte sequence and receive file identifiers in return, as described above. The binary search engine 104 may then take any of a number of further acts described with respect to FIGS. 1a-1d.

In various implementations, the inverted index 106 may specify byte sequences of a fixed length, such as n-gram byte sequences with a fixed length of four bytes (e.g., 4-grams). For each specified byte sequence, the inverted index may also specify one or more file identifiers of files that include that specified byte sequence as file content. FIGS. 1a-1d show an example of such an inverted index 106.

The inverted index 106 may be generated by the binary search engine 104, by another component of the computing device(s) 102, or by other computing device(s) 102. It may be generated or updated periodically from the corpus of files mentioned above. It may also be generated or updated responsive to changes or additions to the corpus of files. To construct the inverted index 106, each byte sequence of the fixed length encountered in one of the files of the corpus of files is added to the byte sequences specified by inverted index 106. Upon encountering a byte sequence, the generating component may determine whether the byte sequence is already specified. If it is specified, the file identifier of the currently processed file is associated with that specified byte sequence. If it is not specified, it is added, and the file identifier of the currently processed file is associated with that added byte sequence.

As illustrated in FIG. 1a, the binary search engine 104 of the computing device(s) 102 may receive from a user 108 a search query 110. The binary search engine 104 may then perform search(es) in the inverted index 106, process results, and respond with a search result 112 to the user 108. The search query 110 may be any of the text/string, structured query/expression, or byte sequence described above. The binary search engine 104 may determine the byte sequences of the fixed length corresponding to the search query 110, query the inverted index for each determined byte sequence, and obtain in response the file identifiers associated with those byte sequences, as described above.

In various implementations, upon obtaining the file identifiers associated with the byte sequences for search query 110, the binary search engine 104 determines an intersection of those results. For example, if the binary search engine 104 searches three byte sequences, and if the first sequence is associated with file identifiers 1, 3, and 4, the second sequence associated with file identifiers 1, 2, and 4, and the third sequence associated with file identifiers 1, 4, and 30, the intersection of the results would include file identifiers 1 and 4. The binary search engine 104 would then return indications of the files associated with file identifiers 1 and 4 as the search results 112.

In some implementations, the binary search engine 104 or other component may perform a further validation operation on the files identified by the intersection of the results. For example, files associated with file identifiers 1 and 4 can be evaluated to ensure that they satisfy the search query 110 before indications of those files are returned as search results 112.

Figure 2:
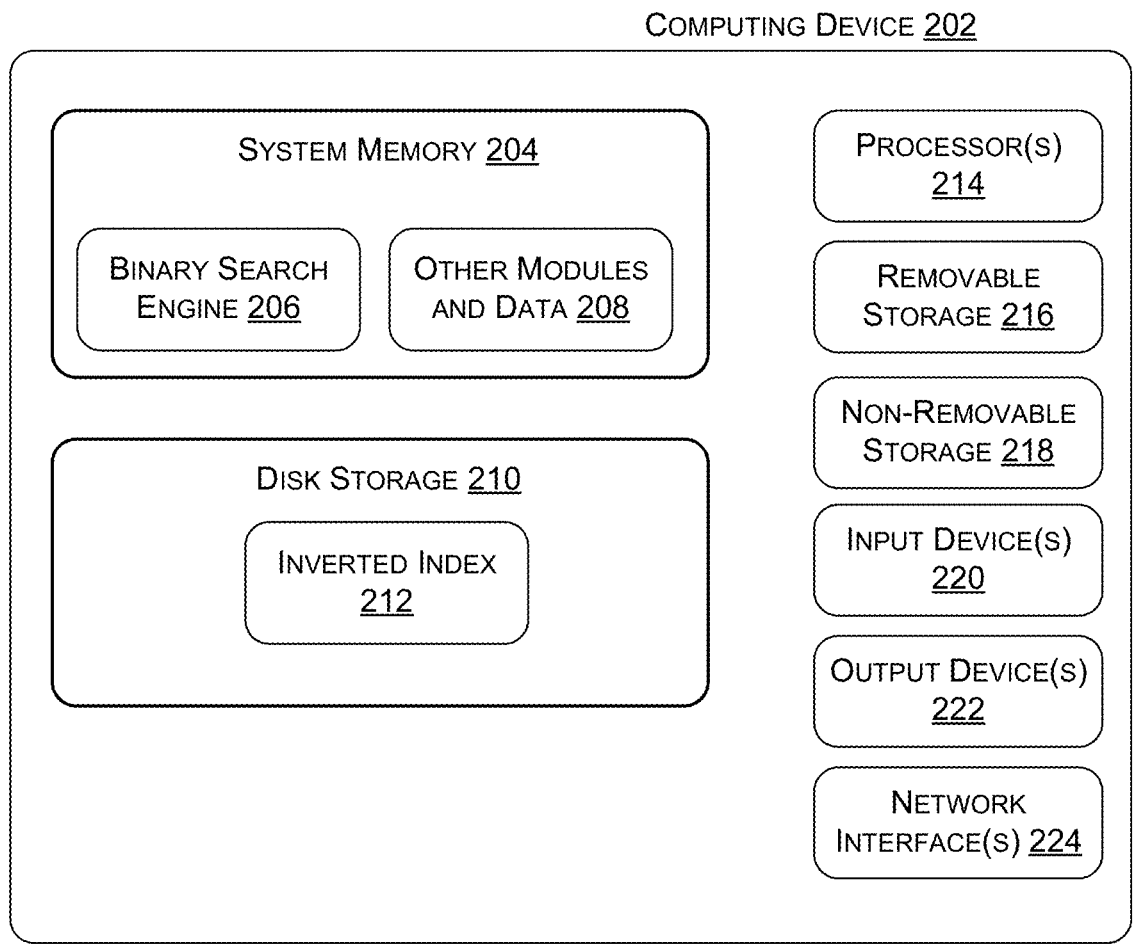
FIG. 2 illustrates a component level view of a computing device configured to implement, in whole or as part of a distributed service, a binary search engine, an inverted index of byte sequences listing files that include those sequences, and other supporting data and logic.

As illustrated in FIG. 1b, computing device(s) 102 may determine the byte sequences of a fixed length comprising a file 114, utilize the binary search engine 104 to search the inverted index 106 for those byte sequences, obtain file identifiers of files including those byte sequences as search results, determine security statuses 116 for those files, identify a subset of the searched byte sequences based on the security statuses 116 and search results, and generate a signature 118 based on the identified byte sequences.

In some implementations, as described above, the binary search engine 104 or another component of the computing device(s) 102 may receive the file 114 and determine the byte sequences of the fixed length comprising that file 114. File 114 may be any sort of file, such as a file of the above-described corpus of files.

Once the byte sequences comprising the file 114 have been determined, the binary search engine 104 searches for each of the byte sequences in the inverted index 106 and receives, as search results, file identifiers associated with each searched byte sequence that is found in the inverted index 106. The binary search engine 104 or another component of the computing device(s) 102 then determines a security status 116 associated with each file identifier. The security statuses 116 may be metadata for the file identifiers and may be found in the inverted index 106 or in another data source. The security status 116 for each file identifier identifies a security status 116 of a file associated with that file identifier. Such a security status 116 may be one of a malware status, a clean status, an unknown status, another status indicating a level of trust.

In further implementations, before searching for each byte sequence comprising the file 114, the binary search engine 104 or other component may filter the byte sequences, removing from the list of byte sequences to be searched any byte sequences known to only be found in files with a clean security status 116. Following the filtering, the binary search engine 104 would proceed with searching the inverted index 106 for the remaining byte sequences.

Following the searches, the binary search engine 104 or other component then creates a list of candidate byte sequences that are only found in files associated with a malware security status 116 or unknown security status 116. If any of the file identifiers associated with a given byte sequence are associated with a clean security status, then that given byte sequence will not be included in the list of candidate byte sequences.

In various implementations, the binary search engine 104 or other component then determines a number of file identifiers associated with each of the candidate byte sequences and selects the top n byte sequences (e.g., top 2 or top 3) with the greatest number of file identifiers. For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 1 and 3 may be selected.

The binary search engine 104 or other component of the computing device(s) 102 may then generate a signature 118 from the selected ones of the candidate byte sequences and associate that signature 118 with the file 114. In some implementations, the signature 118 may then be shared with a security service to aid in malware detection and analysis.

Figure 1C:
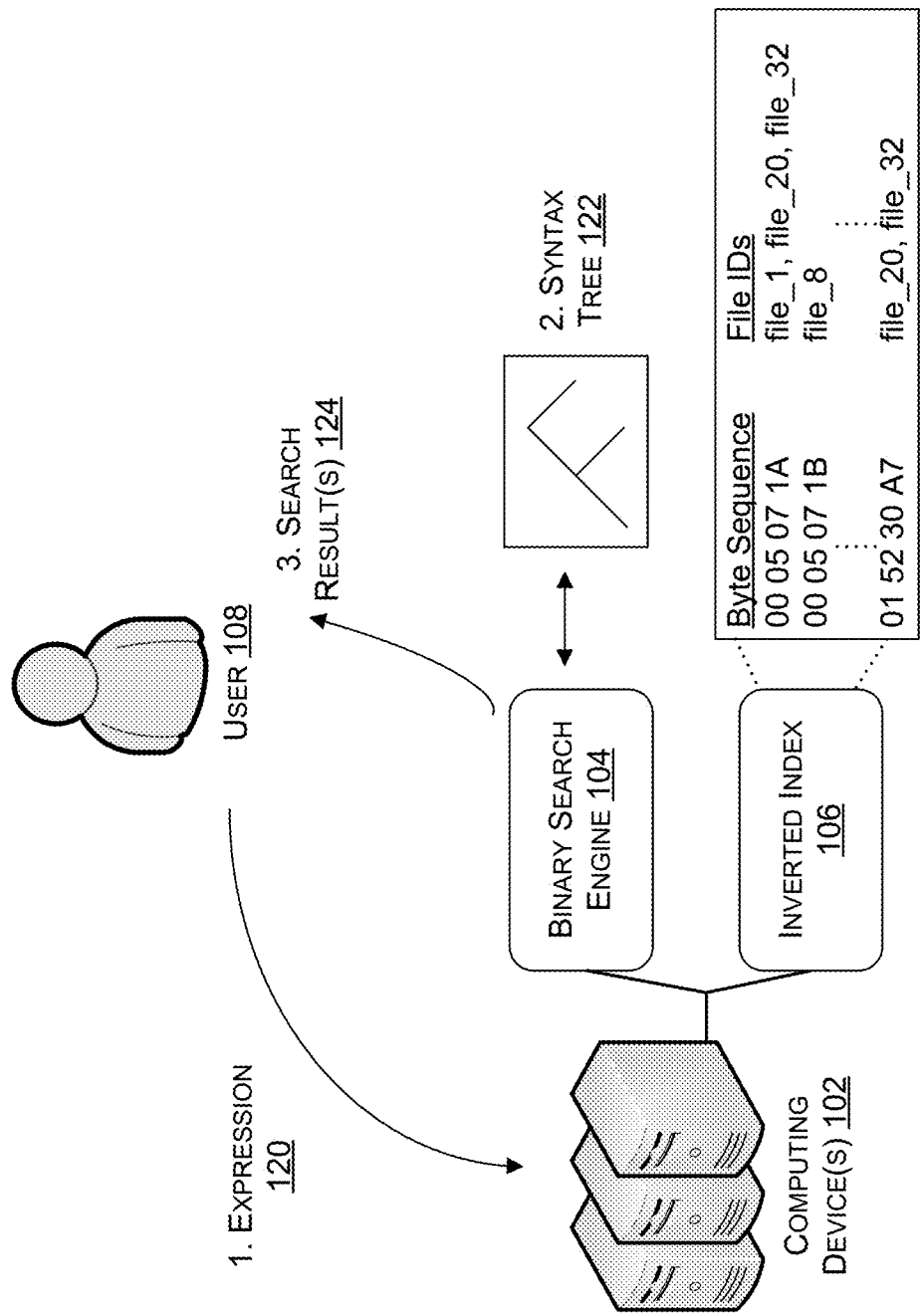

As illustrated in FIG. 1c, the binary search engine 104 of the computing device(s) 102 may receive an expression 120 as a search query from a user 108. The binary search engine 104 may then perform search(es) in the inverted index 106, evaluate the results of the searches using a syntax tree 122 constructed from logical operator(s) included in the expression 120, and respond with a search result 124 to the user 108 based on the evaluating.

The expression 120 may comprise at least two search terms and at least one logical operator. For example, the expression 120 may be something like "includes 'hello' AND 'world.'" In that expression 120, "hello" and "world" are the search terms, and AND is the logical operator. Upon receiving the expression 120, the binary search engine 104 may determine the byte sequences of a fixed length comprising each search term and query the inverted index 106 with those byte sequences.

The binary search engine 104 or another component of the computing device(s) 102 may also construct a syntax tree 122 based on the logical operator(s) included in the expression 120. The search terms of the expression 120 become the leaves of the syntax tree 122.

In various implementations, upon constructing the syntax tree 122 and searching for the byte sequences comprising the search terms, the binary search engine 104 or other component evaluates the results of the searching using the syntax tree 122 to determine search result(s) 124. Those search result(s) 124 are then returned to the user 108.

In some implementations, the binary search engine 104 or other component may perform a validation operation before returning the search result(s) 124 to ensure that each file identified as a search result 124 satisfies the expression 120.

Figure 1D:
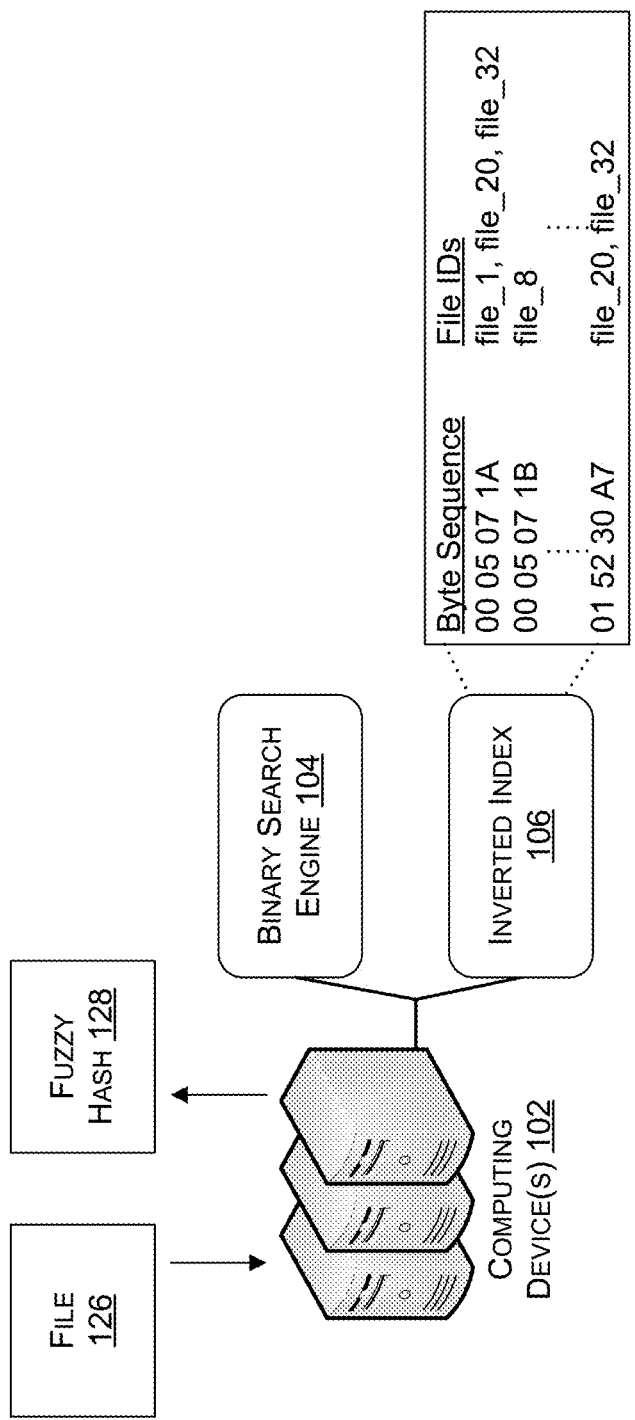

As illustrated in FIG. 1d, computing device(s) may determine the byte sequences comprising a file 126, search for those byte sequences in an inverted index 106 using the binary search engine 104, identify ones of the byte sequences that are associated with the fewest file identifiers, and construct a fuzzy hash 128 from those ones of the byte sequences.

In some implementations, as described above, the binary search engine 104 or another component of the computing device(s) 102 may receive the file 126 and determine the byte sequences of the fixed length comprising that file 126. File 126 may be any sort of file, such as a file of the above-described corpus of files.

Once the byte sequences comprising the file 126 have been determined, the binary search engine 104 searches for each of the byte sequences in the inverted index 106 and receives, as search results, file identifiers associated with each searched byte sequence that is found in the inverted index 106.

In various implementations, the binary search engine 104 or other component then determines a number of file identifiers associated with each of the byte sequences and selects the top n byte sequences (e.g., top 2 or top 3) with the fewest number of file identifiers (but which have more than zero file identifiers). For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 2 and 5 may be selected. The relatedness confidence threshold used in selecting the top n byte sequences may be determined based on a desired level of confidence that a particular byte sequence is relatively unique for the file in which it appears, appearing in that file and its variants but not in other files.

The selected byte sequences are then used to construct a fuzzy hash 128, which may then be provided to security service(s). Also, the length of the byte sequence used for fuzzy hashing may differ from the fixed length of the byte sequences of the inverted index. For example, the inverted index could use byte sequences with a fixed length of four bytes, but the byte sequences used for fuzzy hashing could be of a length of ten bytes.

Example System

FIG. 2 illustrates a component level view of a computing device configured to implement, in whole or as part of a distributed service, a binary search engine, an inverted index of byte sequences listing files that include those sequences, and other supporting data and logic. As illustrated, computing device 202 comprises a system memory 204 storing a binary search engine 206 and other modules and data 208 as well as disk storage 210 storing an inverted index 212. Also, computing device 202 includes processor(s) 214, a removable storage 216 and non-removable storage 218, input device(s) 220, output device(s) 222, and network interfaces 224.

In various embodiments, system memory 204 is volatile (such as RAM), non-volatile (such as ROM, flash memory, etc.) or some combination of the two. The binary search engine 206 is an example of similarly named components further describe herein. Other modules and data 208 support functionality described further with respect to FIGS. 1-6.

Disk storage 210 may comprise data storage device(s) (removable and/or non-removable) such as, for example, magnetic disks, optical disks, or tape. Such storage device(s) may comprise non-volatile memory (such as ROM, flash memory, etc.). The inverted index 212 is an example of similarly named components further describe herein. While the inverted index 212 is shown as being stored on disk storage 210, it is to be understood that the inverted index 212 may be stored wholly or in part in system memory 204 or in any other sort of memory or storage.

In some embodiments, the processor(s) 214 include a central processing unit (CPU), a graphics processing unit (GPU), or both CPU and GPU, or other processing unit or component known in the art.

Computing device 202 also includes additional data storage devices (removable and/or non-removable) such as, for example, magnetic disks, optical disks, or tape. Such additional storage is illustrated in FIG. 2 by removable storage 216 and non-removable storage 218. Non-transitory computer-readable media may include volatile and nonvolatile, removable and non-removable media implemented in any method or technology for storage of information, such as computer readable instructions, data structures, program modules, or other data. System memory 204, disk storage 210, removable storage 216 and non-removable storage 218 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 202. Any such non-transitory computer-readable media may be part of the computing device 202.

Computing device 202 also has input device(s) 220, such as a keyboard, a mouse, a touch-sensitive display, voice input device, etc., and output device(s) 222 such as a display, speakers, a printer, etc. These devices are well known in the art and need not be discussed at length here.

Computing device 202 also contains network interface 224 capable of communicating with other devices over one or more networks, such as those discussed herein.

Example Processes

FIGS. 3-6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
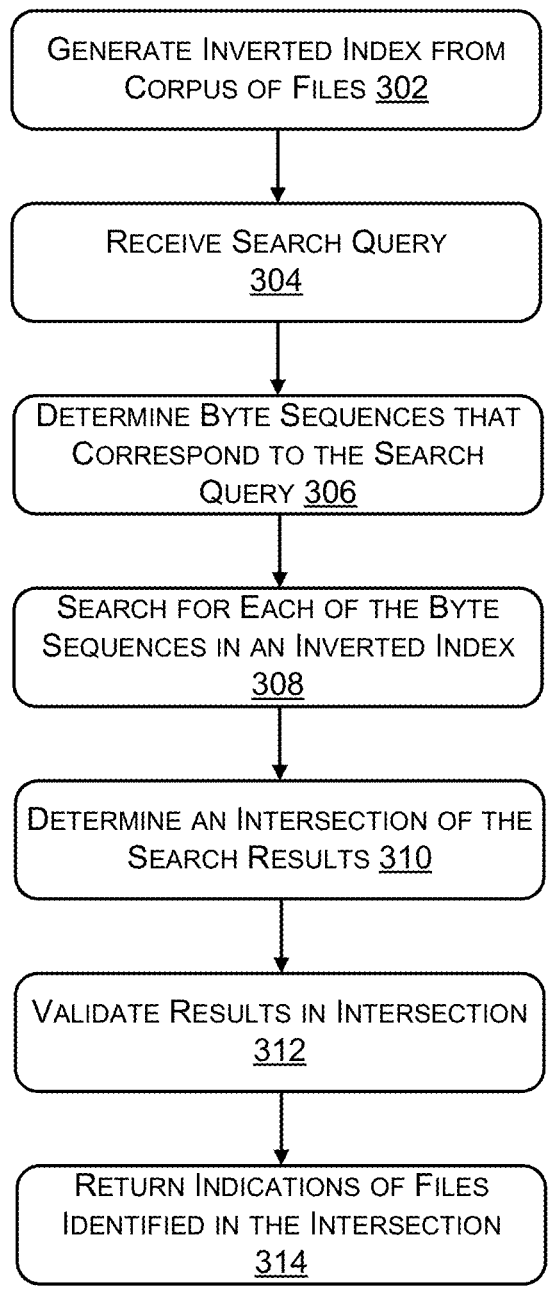
FIG. 3 illustrates example operations associated with the binary search engine, including receiving a search query, searching for byte sequences corresponding to that search query in an inverted index, determining an intersection of the search results, and returning an indication of files identified in the intersection.

FIG. 3 illustrates example operations associated with the binary search engine, including receiving a search query, searching for byte sequences corresponding to that search query in an inverted index, determining an intersection of the search results, and returning an indication of files identified in the intersection.

The operations include, at 302, generating, by a system comprising one or more processors, an inverted index from a corpus of files, such as a corpus of malware files. The files may be binary files or executable files. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes. Further, the one or more processors, along with executable instructions for performing the operations shown in FIG. 3, and the inverted index may be distributed across a plurality of computing devices.

At 304, the system may receive a search query.

At 306, the system may determine a plurality of byte sequences of a fixed length that correspond to the search query At 308, the system may search for each of the byte sequences in the inverted index that specifies byte sequences of the fixed length and, for each specified byte sequence, file identifiers of files that include the specified byte sequence.

At 310, the system may determine an intersection of search results of the searching.

At 312, the system may validate that the search results included in the intersection include the search query.

At 314, the system may return indications of files associated with file identifiers that are included in the intersection in response to the search query.

Figure 4:
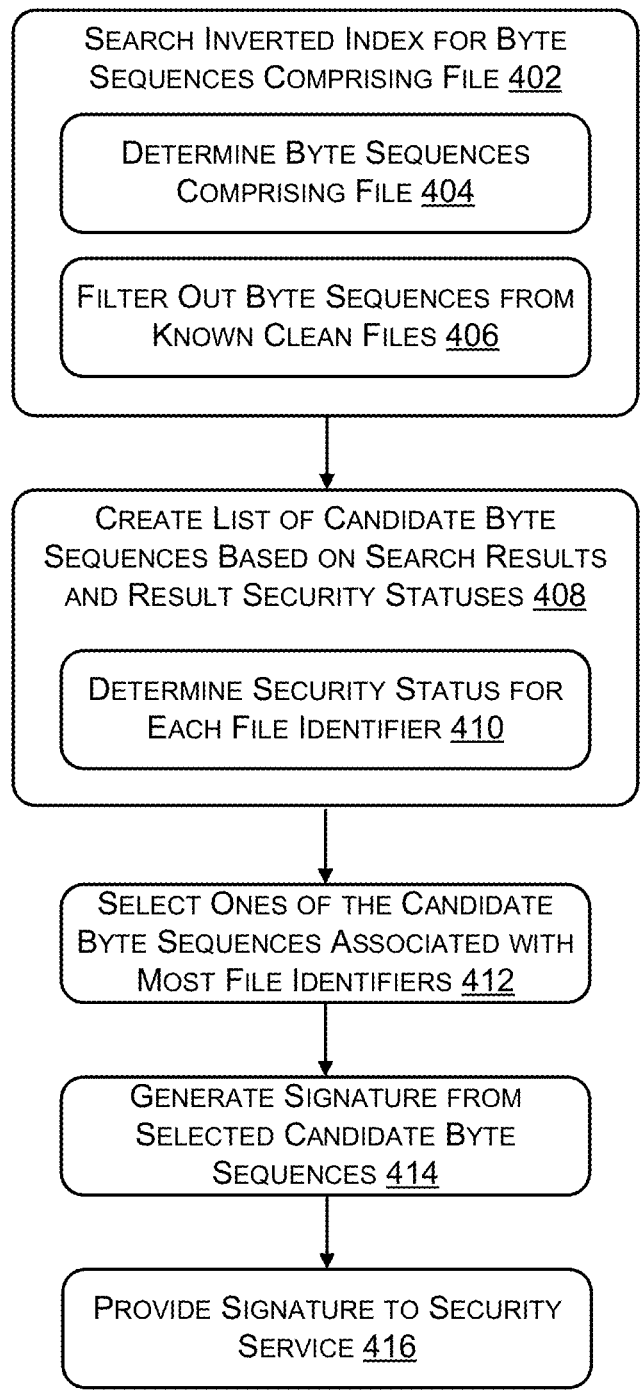
FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

The operations include, at 402, for each byte sequence of a fixed length comprising a file, searching an inverted index which specifies byte sequences of the fixed length and, for each specified byte sequence, file identifiers of files that include the specified byte sequence. In some implementations, the byte sequences of the fixed length are n-grams with a length of four bytes. Further, each file identifier may be associated with a security status. For example, the security status associated with each file identifier may be one of a malware status, a clean status, an unknown status, or another status indicating a level of trust. At 404, the searching also includes determining the byte sequences of the fixed length comprising the file. At 406, the searching further includes filtering out byte sequences known to be found in files with file identifiers associated with a clean status and searching for the remaining byte sequences comprising the file.

At 408, the operations further include, based on results of the searching, creating a list of candidate byte sequences, wherein the candidate byte sequences are only found in files with file identifiers that are associated with a malware status or an unknown status. At 410, the creating may also include determining a security status for each file identifier returned from the searching, the security status being metadata for the file identifier.

At 412, the operations include selecting ones of the candidate byte sequences that are associated with the most file identifiers.

At 414, the operations additionally include generating a signature from selected ones of the candidate byte sequences.

At 416, the operations include providing the signature to a security service.

Figure 5:
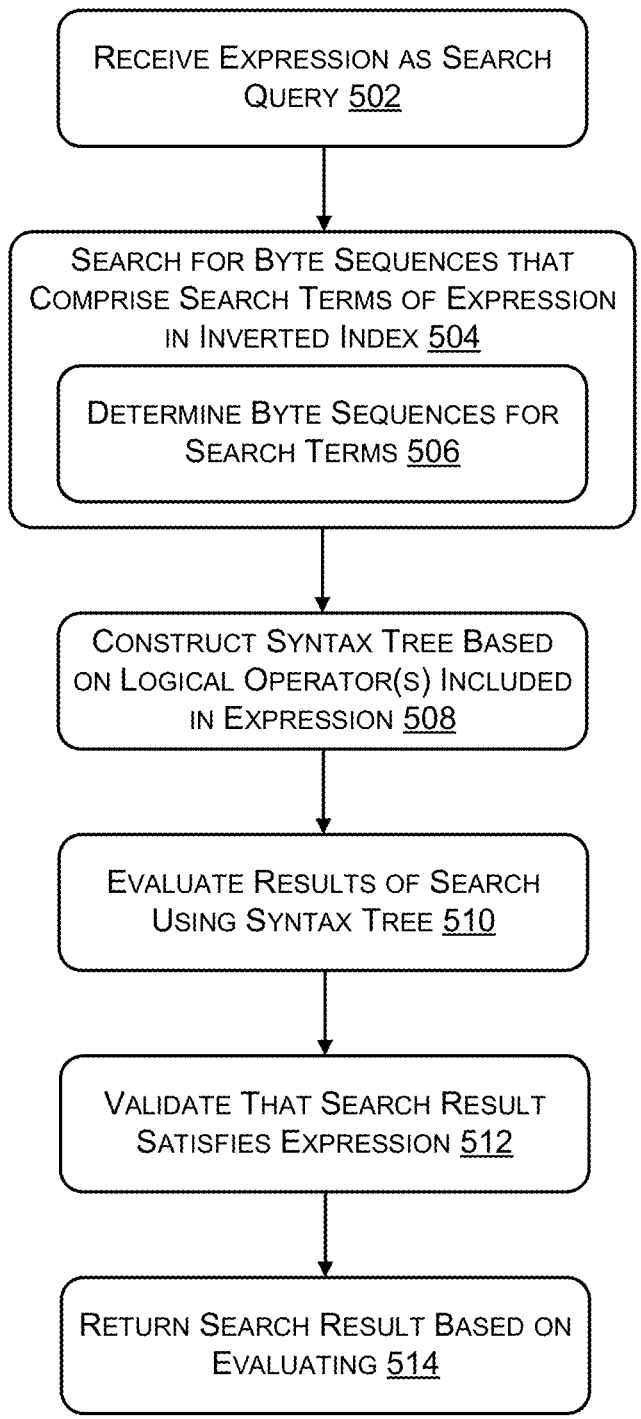
FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluation.

FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluating.

The operations include, at 502, receiving an expression as a search query. The expression includes at least one logical operator and at least two search terms.

At 504, the operations further include searching for byte sequences of a fixed length that comprise each of the search terms in an inverted index. The inverted index specifies byte sequences of the fixed length and, for each specified byte sequence, file identifiers of files that include the specified byte sequence. In some implementations, the byte sequences of the fixed length are n-grams with a length of four bytes. At 506, the searching may also include determining a plurality of byte sequences of a fixed length that correspond to each search term.

At 508, the operations include constructing a syntax tree based on the at least one logical operator. The search terms are evaluated as leaves of the syntax tree, each leaf comprising one or more byte sequences associated with one of the search terms.

At 510, the operations additionally include evaluating results of the searching using the syntax tree constructed from the at least one logical operator.

At 512, the operations include validating that a file corresponding to a search result satisfies the expression.

At 514, the operations also include returning the search result to the search query based at least in part on the evaluating.

Figure 6:
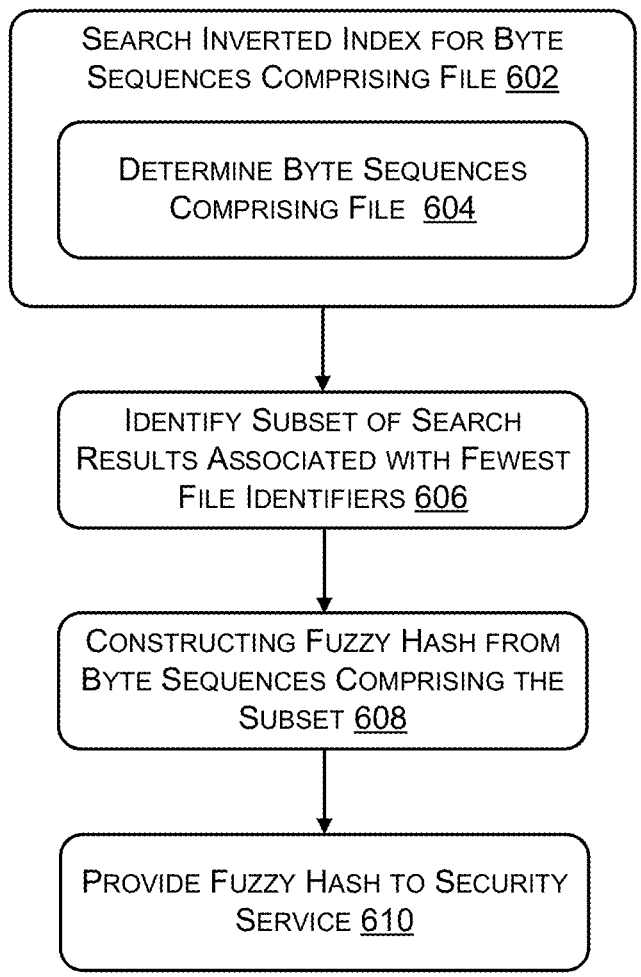
FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

The operations include, at 602, for each byte sequence of a fixed length comprising a file, searching by one or more processors an inverted index which specifies byte sequences of the fixed length and, for each specified byte sequence, file identifiers of files that include the specified byte sequence. In some implementations, the byte sequences of the fixed length are n-grams with a length of four bytes. At 604, the searching also includes determining the byte sequences of the fixed length comprising the file.

At 606, the one or more processors identify a subset of search results of the searching that are associated with the fewest file identifiers. The identifying may be based at least in part on a relatedness confidence threshold.

At 608, the one or more processors construct a fuzzy hash from byte sequences comprising the subset of the search results.

At 610, the one or more processors provide the fuzzy hash to a security service.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system comprising:
one or more processors; and
memory storing computer-executable instructions that, when executed by the one or more processors, cause the one or more processors to perform operations comprising:
receiving a search query based on user input, wherein the search query is an expression comprising a plurality of search terms and at least one logical operator;
determining one or more target byte sequences of a fixed length that correspond to the search query;
searching for the one or more target byte sequences in an inverted index, wherein the inverted index maps a plurality of byte sequences of the fixed length to one or more file identifiers of one or more files that include individual ones of the plurality of byte sequences;
generating a syntax tree based on the at least one logical operator of the search query; and identifying, by evaluating search results of the searching using the syntax tree, at least one file that includes the one or more target byte sequences.

2. The computing system of claim 1, wherein the operations further comprise generating the inverted index from a corpus of files that contains the one or more files.

3. The computing system of claim 1, wherein storage of the inverted index is distributed across a plurality of computing devices.

4. The computing system of claim 1, wherein the one or more target byte sequences are n-grams and the fixed length is four bytes.

5. The computing system of claim 1, wherein the one or more target byte sequences are determined based on individual search terms, of the plurality of search terms.

6. The computing system of claim 1, wherein a plurality of leaves of the syntax tree are associated with the plurality of search terms.

7. The computing system of claim 6, wherein the operations further comprise validating that the at least one file satisfies the expression.

8. The computing system of claim 2, wherein the corpus of files comprises at least one of:
malware files,
binary files,
executable files, or
unstructured files.

9. A computer-implemented method comprising:
receiving a search query based on user input, wherein the search query is an expression comprising a plurality of search terms and at least one logical operator;
determining one or more target byte sequences of a fixed length that correspond to the search query;
searching for the one or more target byte sequences in an inverted index, wherein the inverted index maps a plurality of byte sequences of the fixed length to one or more file identifiers of one or more files that include individual ones of the plurality of byte sequences;
generating a syntax tree based on the at least one logical operator of the search query; and
identifying, by evaluating search results of the searching using the syntax tree, at least one file that includes the one or more target byte sequences.

10. The computer-implemented method of claim 9, further comprising generating the inverted index from a corpus of files that contains the one or more files.

11. The computer-implemented method of claim 9, wherein the one or more target byte sequences are n-grams and the fixed length is four bytes.

12. The computer-implemented method of claim 9, wherein the one or more target byte sequences are determined based on individual search terms, of the plurality of search terms.

13. The computer-implemented method of claim 9, wherein a plurality of leaves of the syntax tree are associated with the plurality of search terms.

14. The computer-implemented method of claim 13, further comprising validating that the at least one file satisfies the expression.

15. One or more non-transitory computer-readable media storing computer-executable instructions that, when executed by one or more processors, cause the one or more processors to perform operations comprising:
receiving a search query based on user input, wherein the search query is an expression comprising a plurality of search terms and at least one logical operator;
determining one or more target byte sequences of a fixed length that correspond to the search query;
searching for the one or more target byte sequences in an inverted index, wherein the inverted index maps a plurality of byte sequences of the fixed length to one or more file identifiers of one or more files that include individual ones of the plurality of byte sequences
generating a syntax tree based on the at least one logical operator of the search query; and
identifying, by evaluating search results of the searching using the syntax tree, at least one file that includes the one or more target byte sequences.

16. The one or more non-transitory computer-readable media of claim 15, wherein the operations further comprise generating the inverted index from a corpus of files that contains the one or more files.

17. The one or more non-transitory computer-readable media of claim 15, wherein the one or more target byte sequences are determined based on individual search terms, of the plurality of search terms.

18. The one or more non-transitory computer-readable media of claim 15, wherein the one or more target byte sequences are n-grams and the fixed length is four bytes.

19. The one or more non-transitory computer-readable media of claim 15, wherein a plurality of leaves of the syntax tree are associated with the plurality of search terms.

20. The one or more non-transitory computer-readable media of claim 19, wherein the operations further comprise validating that the at least one file satisfies the expression.

* * * * *